US012703154B2

(12) United States Patent
Lanfant et al.

(10) Patent No.: US 12,703,154 B2
(45) Date of Patent: Aug. 11, 2026

(54) METHOD FOR FORMING A SOUND ATTENUATION STRUCTURE PROVIDED WITH S-SHAPED CELLS

(71) Applicants: SAFRAN, Paris (FR); SAFRAN NACELLES, Gonfreville l'Orcher (FR)

(72) Inventors: Nicolas Pierre Lanfant, Moissy-Cramayel (FR); Marc Versaevel, Moissy-Cramayel (FR); Fabien Arnaud, Moissy-Cramayel (FR)

(73) Assignees: SAFRAN, Paris (FR); SAFRAN NACELLES, Gonfreville l'Orcher (FR)

(*) Notice: Subject to any disclaimer, the term of this patent is extended or adjusted under 35 U.S.C. 154(b) by 0 days.

(21) Appl. No.: 19/124,643

(22) PCT Filed: Oct. 16, 2023

(86) PCT No.: PCT/FR2023/051609
§ 371 (c)(1),
(2) Date: Apr. 25, 2025

(87) PCT Pub. No.: WO2024/089342
PCT Pub. Date: May 2, 2024

(65) Prior Publication Data

US 2026/0008238 A1 Jan. 8, 2026

(30) Foreign Application Priority Data

Oct. 26, 2022 (FR) ...................................... 2211159

(51) Int. Cl.
*B29C 65/36* (2006.01)
*B21D 53/92* (2006.01)
(Continued)

(52) U.S. Cl.
CPC .......... *B29C 65/3656* (2013.01); *B21D 53/92* (2013.01); *B29C 66/74283* (2013.01);
(Continued)

(58) Field of Classification Search
CPC ............ B29C 65/3456; B29C 65/3656; B29C 66/742; B29C 66/7422; B29C 66/74283;
(Continued)

(56) References Cited

U.S. PATENT DOCUMENTS

| | | | | |
|---|---|---|---|---|
| 5,912,442 A | 6/1999 | Nye et al. | | |
| 8,820,477 B1 * | 9/2014 | Herrera | G10K 11/168 181/292 | |

(Continued)

FOREIGN PATENT DOCUMENTS

| | | |
|---|---|---|
| EP | EP 2 833 356 A1 | 2/2015 |
| EP | EP 3 676 825 A1 | 7/2020 |

(Continued)

OTHER PUBLICATIONS

International Search Report as issued in International Patent Application No. PCT/FR2023/051609, dated Jan. 2, 2024.

(Continued)

*Primary Examiner* — Carson Gross
(74) *Attorney, Agent, or Firm* — CUSHMAN PARTNERS, LLC

(57) ABSTRACT

A method for forming an acoustic resonator panel for an aircraft propulsion assembly nacelle, the acoustic panel including cells with transverse internal obstacles in order to lengthen the path traveled by the sound waves. The method includes forming a perforated metal sheet, stacking a plurality of thermoplastic cellular cores and at least one perforated sheet, two successive cellular cores being separated by a perforated sheet, compacting the stack, and thermoplastic welding.

16 Claims, 4 Drawing Sheets

(51) Int. Cl.

| | |
|---|---|
| ***B29C 65/00*** | (2006.01) |
| ***B32B 3/12*** | (2006.01) |
| ***B32B 3/26*** | (2006.01) |
| ***B32B 15/08*** | (2006.01) |
| ***B32B 15/18*** | (2006.01) |
| ***B64D 33/04*** | (2006.01) |

(52) U.S. Cl.
CPC ................ *B32B 3/12* (2013.01); *B32B 3/266* (2013.01); *B32B 15/08* (2013.01); *B32B 15/18* (2013.01); *B64D 33/06* (2013.01); *B32B 2260/02* (2013.01); *B32B 2260/046* (2013.01); *B32B 2307/102* (2013.01); *B32B 2307/7376* (2023.05); *B32B 2605/18* (2013.01)

(58) Field of Classification Search
CPC ............ B29C 65/3404; B29C 65/3444; B29C 65/3448; B29C 65/3476; B29C 65/36; B32B 37/04; B32B 15/08; B32B 15/085; B32B 15/088; B32B 3/12; B64D 33/06; B64D 2033/0206; F02C 7/045; F02K 1/827; B29D 24/005; B29D 99/0089; Y10T 428/1234; Y10T 428/236; Y10T 428/24149; Y10T 428/14165; G10K 11/168; G10K 11/16; G10K 11/161; G10K 11/172
See application file for complete search history.

(56) References Cited

U.S. PATENT DOCUMENTS

| | | | | |
|---|---|---|---|---|
| 9,447,576 | B2 | 9/2016 | Liou et al. | |
| 2004/0163888 | A1* | 8/2004 | Johnson | F02K 1/827 181/294 |
| 2013/0171407 | A1* | 7/2013 | Franzoi | G10K 11/172 428/116 |
| 2013/0337223 | A1* | 12/2013 | Jung | B32B 15/18 428/116 |
| 2020/0199866 | A1* | 6/2020 | Aten | E04B 1/8209 |
| 2022/0199064 | A1* | 6/2022 | Quesada | G10K 11/168 |

FOREIGN PATENT DOCUMENTS

| | | | |
|---|---|---|---|
| FR | FR 3 103 054 | A1 | 5/2021 |
| GB | GB 1 594 382 | A | 7/1981 |
| GB | GB 2 314 526 | A | 1/1998 |
| WO | WO 2019/043344 | A1 | 3/2019 |

OTHER PUBLICATIONS

International Preliminary Report on Patentability and the Written Opinion of the International Searching Authority as issued in International Patent Application No. PCT/FR2023/051609, dated Jan. 2, 2024.

* cited by examiner

[Fig. 1]
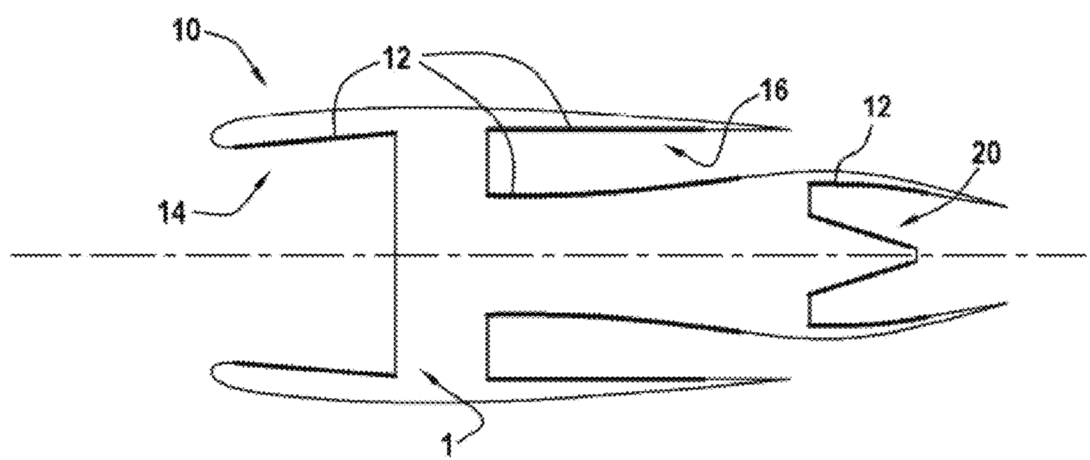
[Fig. 2]
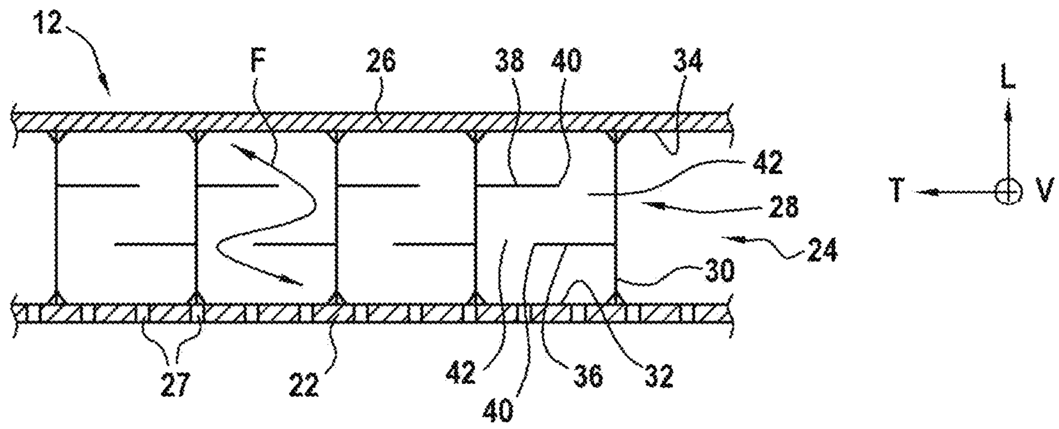

[Fig. 3]
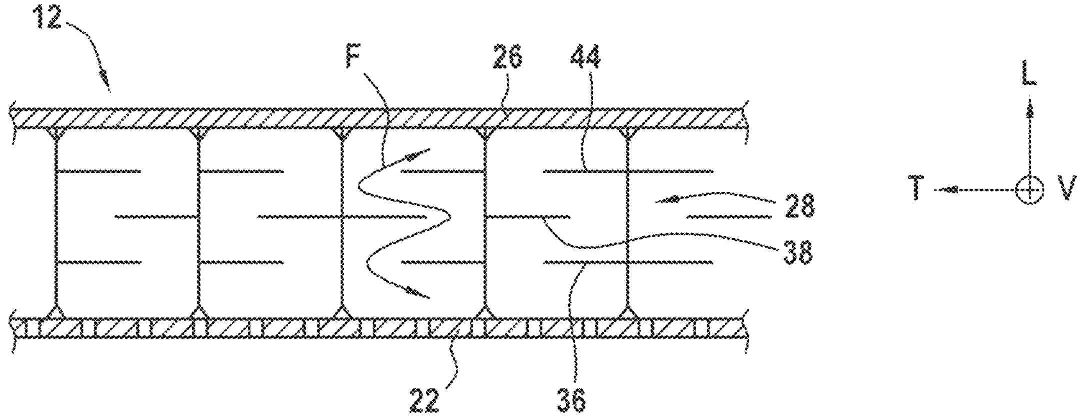
[Fig. 4]
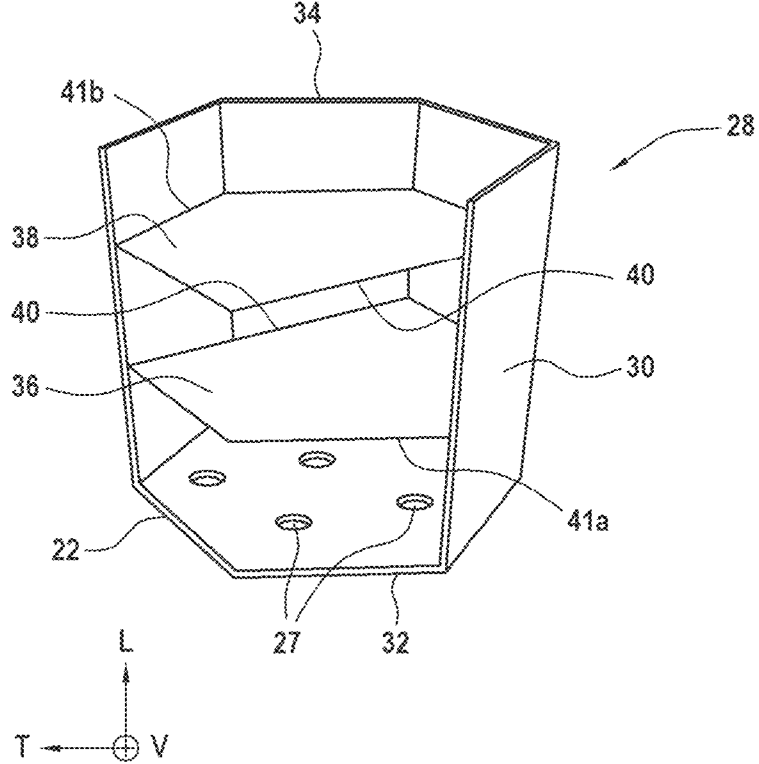

[Fig. 5]
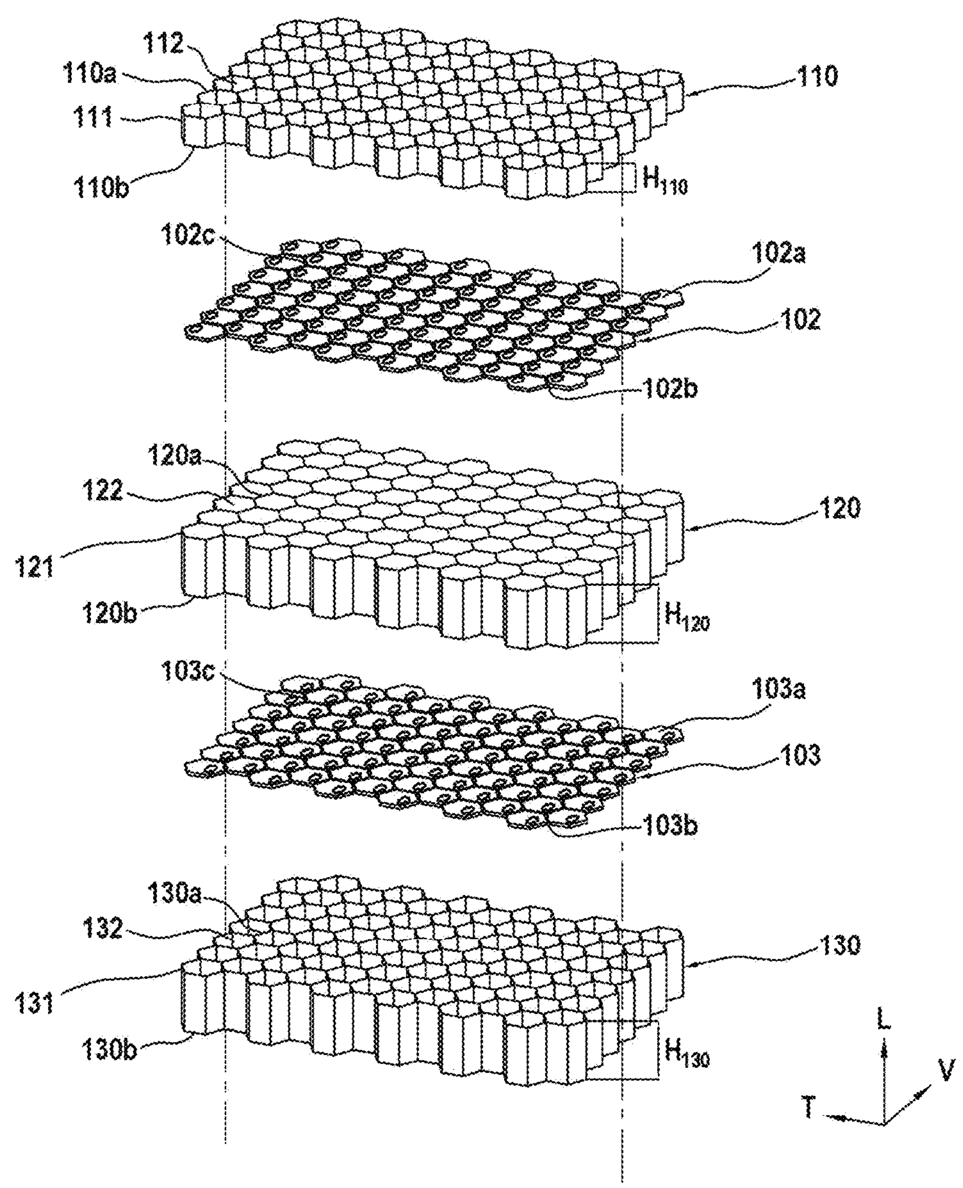

[Fig. 6]
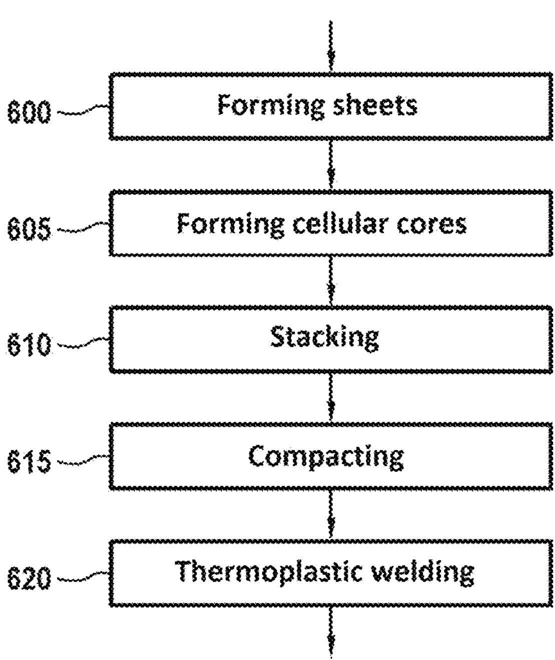

METHOD FOR FORMING A SOUND ATTENUATION STRUCTURE PROVIDED WITH S-SHAPED CELLS

CROSS-REFERENCE TO RELATED APPLICATIONS

This application is the U.S. National Stage of PCT/FR2023/051609, filed Oct. 16, 2023, which in turn claims priority to French patent application number 2211159 filed Oct. 26, 2022. The content of these applications are incorporated herein by reference in their entireties.

TECHNICAL FIELD

The present invention relates to the general field of sound attenuation structures. It relates more particularly to sound attenuation structures used to reduce noise produced in aircraft engines such as in gas turbines or their exhausts.

PRIOR ART

The challenges of commercial aviation regarding the reduction of fuel consumption and the ecological impact lead to a rethinking of aircraft engine architectures. Two characteristics are particularly studied for their influence on the performance of the propulsion system: the bypass ratio (ratio of the air flow passing through the secondary flow to the air flow passing through the primary flow of the engine) and the drag induced by the propulsion system.

It has been proven and shared by the entire industry that an increase in the bypass ratio improves engine efficiency (reduces its consumption and reduces its harmful emissions). This increase in the bypass ratio is achieved in practice by increasing the diameter of the turbomachine fan. However, this increase in the diameter of the secondary flow induces an increase in the same proportions of the diameter of the casing and the nacelle. If the architecture of the fan module is not redesigned, it is easy to understand the negative impact of the increase in drag induced by the propulsion unit having larger external surfaces in contact with the air. One of the paths studied therefore leads to shortening and thinning the external casing and the nacelle of the engine to reduce its mass and drag.

On current engines, sound attenuation is partly achieved using acoustic panels disposed in the casing and nacelle. To make the external casing more compact, the acoustic treatments themselves will therefore have to become more compact.

Acoustic panels are mechanical elements similar to cellular boxes allowing to attenuate noises emitted by the engine. The shape of the honeycomb cells and the thickness of these panels are designed to minimize engine noise pollution, particularly during certain operating phases such as takeoff and landing. Noise reduction is an even more important issue around airports and neighboring towns.

In future architectures, two new difficulties arise: the large diameter fan will rotate more slowly and will therefore generate lower frequency sound waves and the structural casing will no longer completely cover the engine and will therefore no longer be able to effectively confine noise.

Sound attenuation structures typically consist of an acoustic surface plate or skin permeable to the acoustic waves that are to be attenuated and a reflective solid plate or skin called a "closing plate", a cellular body being disposed between these two walls. The cellular body is generally constituted by a set of partitions, for example in the shape of a honeycomb. As is well known, such structures form Helmholtz-type resonators that allow to attenuate acoustic waves in a certain frequency range. Sound attenuation structures of this type are described in particular in documents U.S. Pat. No. 5,912,442 and GB 2 314 526. However, the sound attenuation structures previously described can only absorb a very limited frequency range.

With such a structure, the absorbed frequency f is of the order of c/4e with e the thickness of the honeycomb and c the speed of sound. Or conversely, the treatment thickness necessary to treat a frequency f is of the order of c/4f.

Thus, if the frequency of the noise to be treated decreases, the required treatment thickness increases. Typically, in the absence of grazing flow effects, a 30 mm thick cellular body is suitable for attenuating frequencies close to 2000 Hz, and a 70 mm thick cellular body is suitable for attenuating frequencies close to 880 Hz. The thickness of the cellular body corresponds to the distance between the permeable acoustic skin and the impermeable acoustic skin. In other words, the acoustic length of the cells is approximately equal to the height of the cellular core.

This attenuation constraint works against reducing the thickness of the structural casing and its surface to satisfy the reduction of mass and drag.

However, it is desirable to produce sound attenuation structures that largely address low frequencies, while having satisfactory performance in the medium and high frequencies, for example in the case of a slow-moving engine fan that produces low frequencies and harmonics. Furthermore, the size and mass of the sound attenuation structure should preferably be limited, for example when it is mounted on an aircraft.

To expand the absorbed frequency range, it is known to superimpose two cellular bodies, preferably each having a honeycomb structure of different sizes to handle different frequencies. Considering DDOF structures for "Double Degree Of Freedom" (or also 2DOF) for acoustic panels having two distinct superimposed cellular bodies, and SDOF structures for "Single Degree Of Freedom" for acoustic panels with a single cellular body.

However, this solution with two stacked cellular bodies has limitations for the treatment of low frequencies. Indeed, to reduce the lowest frequencies, it is necessary to use very thick cellular bodies. Thus, the sound attenuation structure comprising two stacked cellular bodies to treat both low and high frequencies will be relatively bulky.

There are various solutions for treating low frequencies while limiting the increase in thickness: the use of a cone introduced into the cells, the inclination of a conventional honeycomb or the manufacture of a labyrinth or S-shaped cell.

Document EP 3 676 825 proposes an acoustic panel structure with a cellular body having cells having an S-shaped structure therein to increase the distance traveled by sound within the cell. The acoustic panels described in this document comprise cells having therein at least one partial obstacle extending from the inner wall of the cell and preventing the wave from propagating directly along the direction in which the cell extends, otherwise the direction of the thickness of the cellular body.

DISCLOSURE OF THE INVENTION

The main purpose of the present invention is therefore to propose a method for manufacturing an acoustic resonator panel for an aircraft propulsion assembly nacelle, the acoustic panel comprising cells with transverse internal obstacles in order to lengthen the path traveled by the sound waves, the method allowing to facilitate the production of the cellular centers of the panel and thus to reduce the cost and manufacturing time of the acoustic panel.

According to an object of the invention, provision is made of a method for manufacturing an acoustic resonator panel for an aircraft propulsion assembly nacelle, the acoustic panel including adjoining acoustic cells which form a cellular center, each cell extending along an axis of acoustic propagation of the sound waves and including inside the cell, at least one partial obstacle which extends transversely with respect to the acoustic propagation axis and which forms an internal passage off-center with respect to the center of the cell to increase the length of the path traveled by the sound waves through the cell, the method for manufacturing the acoustic panel comprising:

- a step of forming at least one perforated metal sheet according to a regular pattern to form said passages, the center of each passage being separated from the center of the adjacent passages by a distance corresponding to the width of the acoustic cells, and each passage having a size smaller than the size of an acoustic cell measured in a plane perpendicular to a main direction, the main direction being parallel to the acoustic propagation axis,
- a step of stacking, in the main direction, a plurality of cellular cores made of thermoplastic resin and at least one perforated metal sheet, two successive cellular cores being separated by a perforated metal sheet, each cellular core including a plurality of honeycomb cells joined in a plane orthogonal to the main direction and forming a portion of acoustic cell of said cellular center in the main direction, and each honeycomb cell of a cellular core being opposite a passage of a sheet, said passage and the central axis of the honeycomb cell not being aligned in the main direction,
- a compaction step during which a compaction pressure is applied in the main direction on either side of the stack obtained following the stacking step,
- and a thermoplastic welding step carried out while maintaining the compaction pressure.

The method according to the invention thus makes it easy to industrialize the manufacture of such an acoustic panel, in particular thanks to the production of the cellular center from a stack of the different parts forming the obstacles and the enclosures of the honeycomb cells or acoustic cells.

Thermoplastic welding allows for local melting of the thermoplastic material and thus fusion of the cellular cores with each other and with said at least one perforated sheet.

The compaction pressure keeps the cellular cores pressed against the perforated metal sheet(s) during thermoplastic welding and thus facilitates and promotes the welding of the elements together. The compaction pressure is maintained while the cellular center cools.

The honeycomb cells, or acoustic cells, can have sections, in a plane orthogonal to the direction of acoustic propagation of the sound waves, of round, hexagonal or other shape.

Thermoplastic cellular cores can be formed by continuous thermoforming technology.

For each honeycomb cell of the cellular center, the perforated passages made in the metal sheet are off-center with respect to the central axis of the honeycomb cell to force the sound wave to follow a non-linear path and therefore longer than if the honeycomb cell was free of transverse obstacles inside its enclosure.

The cellular cores can be made of a PAEK (Polyarylether ketone), PPS (Polyphenylene sulfone), PSU (Polysulfone), PC (Polycarbonate), PA (Polyamide), PP (Polypropylene), PEI (Polyether imide) type resin.

In a first embodiment of the manufacturing method according to the invention, the thermoplastic welding step comprises pulling said at least one perforated metal sheet in at least one direction perpendicular to the main direction, the tensioning allowing to stretch the sheet so that it is flatter and does not form creases.

In a second embodiment of the manufacturing method according to the invention, thermoplastic welding can be induction welding or resistive welding.

In the case of induction welding, the stack forming the cellular center is introduced into a magnetic field which causes said at least one perforated metal sheet to heat up and which results in local melting of the thermoplastic material and thus fusion of the cellular cores with each other and with said at least one perforated sheet.

The perforated sheet could be made of stainless steel with good magnetic properties.

In the case of resistive welding, an electric current is applied to said at least one perforated metal sheet to heat the sheet(s) by Joule effect and cause local melting of the thermoplastic material and thus fusion of the cellular cores with each other and with said at least one perforated sheet.

In a third embodiment of the manufacturing method according to the invention, the method may further comprise, prior to the stacking step, a step of impregnating said at least one perforated metal sheet with a thermoplastic resin or a step of bonding a pure thermoplastic film to the or each perforated metal sheet.

The preliminary impregnation step allows thermoplastic resin to be applied to the perforated metal sheet to improve the welding between the stages of the cellular center. Preferably, the thermoplastic resin used for impregnation is the same as that in which the cellular cores are made.

In a variant, rather than impregnating said at least one perforated metal sheet with a thermoplastic resin, the method may further comprise, prior to the stacking step, a step of impregnating the cellular center with a thermoplastic resin or a step of bonding a pure thermoplastic film to the cellular center.

In a fourth embodiment of the manufacturing method according to the invention, thermoplastic welding is preferably carried out at a temperature comprised between the glass transition temperature and the melting temperature of the thermoplastic cellular cores for amorphous thermoplastics, and at a temperature close to the melting temperature of the cellular cores for semi-crystalline thermoplastics.

The temperature is controlled by the electric current applied to said at least one perforated metal sheet in the case of resistive welding (typically with a power density of 5 to 50 $W/cm^2$), while, in the case of magnetic welding, the temperature is controlled by the magnetic power (the efficiency depending on the choice of the inductor).

For semi-crystalline thermoplastics (PAEK for example), it is necessary to be above the glass transition temperature but this is generally not sufficient. It is necessary to go towards temperatures close to the melting temperature or even slightly above. Welding is carried out so that the heating remains localized at the interface so that the rest of the cells remain at a temperature lower than the glass transition to avoid collapsing the assembly when pressure is applied.

In a fifth embodiment of the manufacturing method according to the invention, when the acoustic panel comprises at least two perforated metal sheets, the passages of two successive perforated metal sheets in the main direction are preferably non-aligned in the main direction.

Having passages that are never aligned two by two successively in the main direction allows to maximize the path traveled by the sound wave between its entry into the honeycomb cell and its exit.

In a sixth embodiment of the manufacturing method according to the invention, the method may further comprise, prior to the stacking step, a step of forming the cellular cores with honeycomb cells having a width comprised between 0.95 and 2.5 cm and a height comprised between 5 and 100 mm, the honeycomb cells of the same cellular core all having the same width and all the same height.

In a seventh embodiment of the manufacturing method according to the invention, the step of stacking the cellular cores and said at least one perforated metal sheet preferably comprises the formation of a stack comprised between 15 and 200 mm in height in the main direction and typically 60 mm.

In an eighth embodiment of the manufacturing method according to the invention, the passages produced during the step of forming said at least one perforated metal sheet preferably all have the same shape with a first dimension in a first direction longer than a second dimension in a second direction, the first direction being orthogonal to the second direction, and the first and second directions being orthogonal to said main direction.

The passages can thus have a rectangular shape, an oblong shape or an oval shape.

In a ninth embodiment of the manufacturing method according to the invention, the step of stacking the cellular cores and said at least one perforated metal sheet preferably comprises the formation of a stack having, in the main direction, a first face and a second face, the method further comprising closing the first face of said stack by an acoustically reflective skin, and closing the second face of said stack by an acoustically transparent skin.

In a variant, the acoustically porous skin may be formed by a stretched perforated metal sheet with a perforation pattern possibly different from the other perforated metal sheets of the acoustic panel.

In a tenth embodiment of the manufacturing method according to the invention, the step of forming at least one perforated metal sheet preferably comprises using a sheet having an acoustic resistance at 105 cm/s of at least 100 rayls cgs, or 1000 Pa·s/m.

If the perforated sheet that forms the obstacles inside the honeycomb cells is too porous, the sound wave may not follow the non-linear path.

In an eleventh embodiment of the manufacturing method according to the invention, thermoplastic resin can be accompanied by fillers or short fibers, which provide greater stiffness and mechanical resistance.

In a twelfth embodiment of the manufacturing method according to the invention, the compaction pressure is preferably comprised between 10 and 200 bars.

In a thirteenth embodiment of the manufacturing method according to the invention, each passage may be formed by a plurality of adjacent orifices. Each passage is made by a plurality of perforations or orifices, the passages being distributed in a regular pattern on the perforated metal sheet.

BRIEF DESCRIPTION OF THE DRAWINGS

FIG. 1 is a schematic sectional view illustrating a nacelle equipped with a plurality of acoustic panels according to the invention;

FIG. 2 is a schematic cross-sectional view illustrating cells of one of the acoustic panels of FIG. 1 equipped with two obstacles forming baffles;

FIG. 3 is a schematic cross-sectional view illustrating cells of one of the acoustic panels of FIG. 1 equipped with three obstacles forming baffles;

FIG. 4 is a schematic perspective view with cutaway illustrating a hexagonal cell of one of the acoustic panels of FIG. 1 equipped with two obstacles forming baffles;

FIG. 5 illustrates an exploded view of a cellular center of an acoustic panel of FIG. 2 according to an embodiment of the manufacturing method of the invention.

FIG. 6 is a flowchart of a method for manufacturing one of the acoustic panels of FIG. 1 according to an embodiment of the invention.

DESCRIPTION OF THE EMBODIMENTS

Identical or similar elements are identified by identical reference signs throughout the figures.

In the description, the terminology longitudinal, vertical and transverse will be adopted without limitation with reference to the trihedron L, V, T indicated in the figures.

The expressions “front” and “rear” will also be used without limitation with reference to the lower part and the upper part respectively of FIGS. 2 to 5.

FIG. 1 shows a nacelle 10 equipped with a plurality of acoustic sound attenuation resonator panels 12 shown schematically in strong lines. Some or all of said acoustic sound attenuation resonator panels, or other acoustic panels may be totally or partially equipped with cellular centers according to the invention.

The acoustic panels 12 are designed to attenuate the noise emitted by the components which are housed in the nacelle 10, such as an engine or a fan (not shown). According to exemplary embodiments of the invention described herein, the acoustic panels 12 are integrated into an air inlet shroud 14, into the secondary flow path 16 and into an ejection nozzle 20.

With reference to FIG. 2, which illustrates a first exemplary embodiment of an acoustic panel 12, the acoustic panel 12 includes successively, from front to rear along the longitudinal axis L, a front acoustic skin 22 which is acoustically porous to sound waves, a cellular center 24, and a rear skin 26 which is solid and therefore acoustically reflective.

The front acoustic skin 22 and the rear skin 26 extend parallel to each other and transversely, that is to say in the transverse direction T which is orthogonal to the longitudinal direction L.

The front acoustic skin 22 has a plurality of perforations 27, or a permeability formed by a wire mesh, which are adapted to allow sound waves to penetrate into the cellular center 24.

The cellular center 24 includes a plurality of acoustic cells 28, or honeycomb cells 28, which are joined to each other in the transverse direction T and the vertical direction V to form a hollow structure such as, for example, a “honeycomb” structure. The direction of the longitudinal axis L corresponds to the direction of acoustic propagation of a sound wave entering an acoustic cell 28 via the acoustic skin 22.

Each cell 28 is delimited by a peripheral enclosure 30 extending substantially parallel to the longitudinal direction L from the acoustic skin 22 to the rear skin 26. The shape of the cell 28 may be of hexagonal cross-section, as can be seen in FIG. 4, or of rectangular, or square, or circular shape, or any other geometric shape.

Also, each cell 28 extends along a main longitudinal axis L, corresponding overall to an axis of propagation of the sound waves, from a front end 32 of the cell 28 resting on the acoustic skin 22, to a rear end 34 resting on the rear skin 26.

It will be noted that the cells 28 are acoustically independent. The term "acoustically independent cells" refers to cells whose enclosure 30 does not significantly propagate acoustic waves from one cell 28 to another. These terms refer to cells separated by sealed walls or walls perforated with one or a few small and limited number of orifices whose function is mainly to facilitate the evacuation of liquids that may penetrate into the cells. These orifices are preferably two to four in number with a unitary section of the order of 1 to 4 $mm^2$, and located in the enclosure 30 of the cells, in the immediate vicinity of the rear end 34 of the acoustic core against the rear skin 26. The obstacles are said to be opaque to acoustic waves, but may however be provided with a drainage device for the evacuation of liquids, preferably made by one or two orifices per obstacle and with a section of the order of 1 to 2 $mm^2$ each.

As can be seen in the exemplary embodiment illustrated in FIG. 2, each cell 28 includes at least a first partial obstacle 36 and even, in this example, a second partial obstacle 38 which extend generally in the transverse direction T from the enclosure 30 of the cell 28. In other words, the obstacles 36 and 38 extend in a plane perpendicular to the main axis of the associated cell 28, the main axis of the cell 28 being coincident with the direction of the longitudinal axis L.

In addition, each obstacle 36, 38 has a free end edge 40 which delimits a passage 42 with the opposite wall 30, to allow the passage of sound waves which penetrate into the associated cell 28.

The obstacles 36, 38 are offset in depth along the main longitudinal axis L of the associated cell 28.

The obstacles 36, 38 are substantially opposite, that is to say that the first obstacle 36 extends from a first hooking edge 41*a* on the left side of the wall 30, according to FIGS. 2 and 4, and the second obstacle 38 extends from a second hooking edge 41*b* on the opposite right side of the wall 30, to form a baffle intended to increase the length of the path traveled by the sound waves through the associated cell 28.

In addition, the length of each obstacle 36, 38 is adapted so that the obstacles 36, 38 partially overlap in a longitudinal projection view on a surface perpendicular to the longitudinal direction.

Thus, the sound waves follow a sinuous path between the obstacles 36, 38, from the front end 32 to the rear end 34 of the associated cell 28. This sinuous path is therefore longer than the straight-line distance between the two end faces 32 and 34.

As illustrated by arrow F in FIG. 2, sound waves follow a winding path that has an apparent length greater than the length of a straight path.

It is found that a cell 28 of 30 millimeters of longitudinal thickness which comprises two obstacles 36 and 38 extending over approximately two thirds of the section of the associated cell 28, is equivalent to a cell without obstacle of 64 millimeters of longitudinal thickness, in terms of noise attenuation with respect to a given frequency.

According to another exemplary embodiment shown in FIG. 3, which is similar to the example shown in FIG. 2, each cell 28 includes a third obstacle 44, the three obstacles 36, 38, 44 have dimensions such that two successive obstacles in the longitudinal direction, have a cumulative surface greater than the section of the cell and a projected surface covering the entire section. In other words, the obstacles are arranged to impose a sinuous path on the sound waves which travel through the associated cell 28, as shown by arrow F.

It is noted that a cell 28 of 30 millimeters of longitudinal thickness which comprises three obstacles 36, 38 and 44 each extending over approximately two thirds of the section of the associated cell as illustrated in FIG. 3, the successive obstacles being attached on opposite walls, is equivalent to a cell without obstacle of 70 millimeters of longitudinal thickness, in terms of attenuation of the noise with respect to another considered frequency.

The cells 28 are made of thermoplastic composite material and the obstacles of metallic material. Also, the obstacles 36, 38 can be welded to the material forming the cells 28.

FIG. 5 illustrates an exploded view of a cellular center 24 of an acoustic panel 12 of FIG. 2 according to an embodiment of the manufacturing method of the invention.

The cellular center 24 comprises thermoplastic cellular cores 110, 120 and 130 and perforated metal sheets 102 and 103.

More particularly, the cellular center 24 comprises a first cellular core 110, a second third cellular core 120 and a third cellular core 130, having respectively a cell height $H_{110}$, $H_{120}$, $H_{130}$, the height being measured in the longitudinal direction L. The three heights $H_{110}$, $H_{120}$, $H_{130}$ may be equal or different. In the example illustrated in FIG. 5, the height $H_{110}$ of the first cellular core 110 is less than those of the second and third cellular cores 120 and 130, these two cellular cores 120 and 130 having an equal cell height.

Each cellular core 110, 120 and 130 comprises an upper longitudinal end, denoted respectively 110*a*, 120*a* and 130*a*, a lower longitudinal end, denoted respectively 110*b*, 120*b* and 130*b*, and enclosure portions, denoted respectively 111, 121 and 131, delimiting partial cells, denoted respectively 112, 122 and 132, extending, in the longitudinal direction L, between the upper longitudinal end 110*a*, 120*a*, 130*a*, and the lower longitudinal end 110*b*, 120*b*, 130*b* of the corresponding cellular core 110, 120, 130.

The cellular cores 110, 120 and 130 have partial cells 112, 122, 132 having a width comprised between 0.95 and 2.5 cm and a height comprised between 5 and 30 mm, the honeycomb cells of the same cellular core all having the same width and all the same height.

The first perforated metal sheet 102 comprises, along the longitudinal direction L, a first longitudinal end 102*a* and a second longitudinal end 102*b*. The first longitudinal end 102*a* faces the lower longitudinal end 110*b* of the first cellular core 110 and the second longitudinal end 102*b* faces the upper longitudinal end 120*a* of the second longitudinal core 120.

The first perforated metal sheet 102 comprises perforations 102*c* forming passages for sound waves. The number of perforations 102*c* corresponds to the number of cells 28 of the cellular center 24, and therefore to the number of partial cells 112, 122, 132 of each cellular core 110, 120, 130.

Each perforation 102*c* is distant from another adjacent perforation 102*c* by a length equal to the width of a cell 112, 122, 132 measured in a plane comprising the transverse direction T and the vertical direction V.

The second perforated metal sheet 103 comprises, along the longitudinal direction L, a first longitudinal end 103*a* and a second longitudinal end 103*b*. The first longitudinal end 103*a* is opposite the lower longitudinal end 120*b* of the second cellular core 120 and the second longitudinal end 103*b* is opposite the upper longitudinal end 130*a* of the third longitudinal core 130.

The second perforated metal sheet 103 comprises perforations 103*c* forming passages for sound waves. The number of perforations 103*c* corresponds to the number of cells 28 of the cellular center 24, and therefore to the number of partial cells 112, 122, 132 of each cellular core 110, 120, 130.

Each perforation 103*c* is distant from another adjacent perforation 103*c* by a length equal to the width of a cell 112, 122, 132 measured in a plane comprising the transverse direction T and the vertical direction V.

Considering the longitudinal direction L, the perforations 103*c* of the second perforated metal sheet 103 and the perforations 102*c* of the first perforated metal sheet 102 are off-center. Thus, no perforation 103*c* of the second perforated metal sheet 103 is aligned with a perforation 102*c* of the first perforated metal sheet 102.

The perforations 102*c* and 103*c* of the first and second perforated metal sheets have elliptical shapes in the example illustrated in FIG. 5.

FIG. 6 shows a flowchart of a method for manufacturing an acoustic panel 12 of FIG. 1 according to an embodiment of the invention with a cellular center 24 having a structure corresponding to that illustrated in FIG. 5.

In a first step 600, the first perforated metal sheet 102 and the second perforated metal sheet 103 are formed, each from a metal sheet perforated in a regular pattern to form said passages with elliptical passages. The metal sheets used to manufacture the perforated metal sheets 102 and 103 have an acoustic resistance at 105 cm/s of at least 100 rayls cgs, or 1000 Pa·s/m.

In a second step 605, a first cellular core 110, a second cellular core 120 and a third cellular core 130 are formed from thermoplastic resin.

In a third step 610, are stacked successively the second perforated metal sheet 103 from front to rear along the longitudinal direction L on the third cellular core 130, then the second cellular core 120 on the second perforated metal sheet 103, then the first perforated metal sheet 102 on the second cellular core 120, and finally the first cellular core 110 on the first perforated metal sheet 102. The stacking is adjusted so that the partial cells 111, 121, 131 are aligned along the longitudinal direction L, that is to say so that each set of three partial cells 111, 121 and 131 forms a cell 28, and so that each perforation 102*c* and 103*c* is inside a cell 28.

The third step 610 may comprise the addition of a solid rear skin 26 at the rear of the stack, and the addition of an acoustic skin 22 at the front of the stack in the longitudinal direction L. The addition of these two skins may also be carried out after the thermoplastic welding of the fifth step.

The stack thus obtained at a height measured in the longitudinal direction L between 15 and 200 mm and typically 60 mm.

In a fourth step 615, a compacting pressure is applied in the longitudinal direction L to the stack forming the cellular center 24 obtained in the third step 610 or to the acoustic panel 12. The compacting pressure is preferably comprised between 2 and 200 bars.

In a fifth step 620, thermoplastic welding is carried out while maintaining the compacting pressure.

Thermoplastic welding is an induction welding or a resistive welding. It allows for local melting of the thermoplastic material and thus fusion of the cellular cores 110, 120, 130 with each other and with the perforated metal sheets 102 and 104.

In the case of induction welding, the stack forming the cellular center 24 is introduced into a magnetic field which causes the perforated metal sheets 102 and 103 to heat up.

In the case of resistive welding, an electric current is applied to the perforated metal sheets 102 and 103 to heat the sheets by the Joule effect.

Thermoplastic welding is carried out at a temperature comprised between the glass transition temperature and the melting temperature of thermoplastic cellular cores.

The temperature is controlled by the electric current applied to said at least one perforated metal sheet in the case of resistive welding (typically with a power density of 5 to 50 W/cm$^2$), while, in the case of magnetic welding, the temperature is controlled by the magnetic power (the efficiency depending on the choice of the inductor).

The fifth thermoplastic welding step may comprise pulling the perforated metal sheet in the transverse direction T and/or the vertical direction V.

The thermoplastic welding ends with cooling of the stack after which the assembly formed by the stack is welded together.

The invention claimed is:

1. A method for manufacturing an acoustic resonator panel for an aircraft propulsion assembly nacelle, the acoustic panel including adjoining acoustic cells which form a cellular center, each cell extending along an axis of acoustic propagation of sound waves and including inside the cell, at least one partial obstacle which extends transversely with respect to the acoustic propagation axis and which forms an internal passage off-center with respect to a center of the cell to increase a length of a path traveled by the sound waves through the cell, the method for manufacturing the acoustic panel comprising:

- a step of forming at least one perforated metal sheet according to a regular pattern to form said internal passages, a center of each internal passage being separated from a center of the adjacent internal passages by a distance corresponding to the width of the acoustic cells, and each internal passage having a size smaller than the size of each acoustic cell measured in a plane perpendicular to a main direction, the main direction being parallel to the acoustic propagation axis,
- a step of stacking, in the main direction, a plurality of cellular cores made of thermoplastic resin and at least one of said at least one perforated metal sheet, two successive cellular cores being separated by one of said at least one perforated metal sheet, each cellular core including a plurality of honeycomb cells joined in a plane orthogonal to the main direction and forming, in combination with adjoining cellular cores on either side of said at least one perforated metal sheet, corresponding portions of said adjoining acoustic cells of said cellular center in the main direction, and each honeycomb cell of a cellular core facing one of said internal passages of said perforated metal sheet, said one internal passage and a central axis of the honeycomb cell not being aligned in the main direction,
- a compaction step during which a compaction pressure is applied in the main direction on either side of the stack obtained following the stacking step,
- and a thermoplastic welding step carried out while maintaining the compacting pressure.

2. The method according to claim 1, wherein the thermoplastic welding step comprises pulling said at least one perforated metal sheet in at least one direction perpendicular to the main direction.

3. The method according to claim 1, further comprising, prior to the stacking step, a step of impregnating said at least one perforated metal sheet with a thermoplastic resin or a step of bonding a pure thermoplastic film to the at least one perforated metal sheet.

4. The method according to claim 1, further comprising, prior to the stacking step, a step of impregnating the cellular center with a thermoplastic resin or a step of bonding a pure thermoplastic film to the cellular center.

5. The method according to claim 1, wherein the thermoplastic welding is carried out at a temperature between the glass transition temperature and the melting temperature of the thermoplastic cellular cores for amorphous thermoplastics, and at a temperature close to the melting temperature of the cellular cores for semi-crystalline thermoplastics.

6. The method according to claim 1, wherein the thermoplastic welding is an induction welding or a resistive welding.

7. The method according to claim 1, wherein when the acoustic panel comprises at least two perforated metal sheets, the passages of two successive perforated metal sheets in the main direction are non-aligned in the main direction.

8. The method according to claim 1, further comprising, prior to the stacking step, a step of forming the cellular cores with honeycomb cells having a width comprised between 0.95 and 2.5 cm and a height comprised between 5 and 100 mm, the honeycomb cells of the same cellular core all having the same width and all the same height.

9. The method according to claim 1, wherein the step of stacking the cellular cores and said at least one perforated metal sheet comprises the formation of a stack comprised between 15 and 200 mm in height in the main direction.

10. The method according to claim 1, wherein the passages produced during the step of forming at least one perforated metal sheet all have the same shape with a first dimension in a first direction longer than a second dimension in a second direction, the first direction being orthogonal to the second direction, and the first and second directions being orthogonal to said main direction.

11. The method according to claim 1, wherein the step of stacking the cellular cores and said at least one perforated metal sheet comprises the formation of a stack having, in the main direction, a first face and a second face, the method further comprising closing the first face of said stack by an acoustically reflective skin, and closing the second face of said stack by an acoustically transparent skin.

12. The method according to claim 1, wherein the step of forming at least one perforated metal sheet comprises using a sheet having an acoustic resistance at 105 cm/s of at least 1000 Pa·s/m.

13. The method according to claim 1, wherein the thermoplastic resin is accompanied by fillers or short fibers.

14. The method according to claim 1, wherein the compacting pressure is comprised between 10 and 200 bars.

15. The method according to claim 1, wherein each passage is formed by a plurality of adjacent orifices.

16. The method according to claim 1, wherein the acoustic panel comprises at least two of said perforated metal sheets, and wherein, for each acoustic cell, successive internal passages of successive perforated metal sheets in the main direction are located on opposite sides of the peripheral enclosure of the acoustic cell, and successive perforated metal sheets partially overlap in projection along the main direction such that their combined projected area covers the entire cross-sectional area of the acoustic cell, thereby constraining sound waves to travel a sinuous path through the cell.

* * * * *